(12) United States Patent
Ma et al.

(10) Patent No.: US 6,854,359 B1
(45) Date of Patent: Feb. 15, 2005

(54) TRANSMISSION MECHANISM FOR DRIVING FOUR WHEELS

(75) Inventors: Weijin Ma, Xinjiang (CN); Mingxue Yang, Xinjiang (CN); Yujiang Wang, Xinjiang (CN); Yingpu Wang, Xinjiang (CN); Bin Liang, Xinjiang (CN); Yongge Fan, Xinjiang (CN); Wenbin Pan, Xinjiang (CN); Feng Gao, Beijing (CN)

(73) Assignee: Xinjiang Shengsheng Co. Ltd., Xinjiang (CN)

( * ) Notice: Subject to any disclaimer, the term of this patent is extended or adjusted under 35 U.S.C. 154(b) by 0 days.

(21) Appl. No.: 10/705,999

(22) Filed: Nov. 12, 2003

(51) Int. Cl.[7] ......................... F16H 48/06; F16H 33/00; F16H 35/00; F16H 37/00
(52) U.S. Cl. ..................... 74/650; 475/203; 475/206; 475/230
(58) Field of Search ............ 74/640, 650; 475/200–201, 475/203, 206, 221, 230

(56) References Cited

U.S. PATENT DOCUMENTS

| | | | | |
|---|---|---|---|---|
| 2,584,799 A | * | 2/1952 | Green | 477/51 |
| 3,575,257 A | * | 4/1971 | Wojcikowski | 180/177 |
| 4,235,125 A | * | 11/1980 | Perlin | 475/254 |
| 4,476,953 A | * | 10/1984 | Hiraiwa | 180/249 |
| 4,601,359 A | * | 7/1986 | Weismann et al. | 180/233 |
| 4,611,504 A | * | 9/1986 | Rundle | 475/198 |
| 4,995,862 A | * | 2/1991 | Arocha | 475/86 |
| 5,041,068 A | * | 8/1991 | Kobayashi | 475/221 |
| 6,634,979 B1 | | 10/2003 | Quaife | |

FOREIGN PATENT DOCUMENTS

| | | | | |
|---|---|---|---|---|
| DE | 3125612 A1 | * | 1/1983 | B60K/17/34 |

* cited by examiner

Primary Examiner—Tisha Lewis
(74) Attorney, Agent, or Firm—Knobbe, Martens, Olson & Bear, LLP

(57) ABSTRACT

A transmission mechanism of an automotive vehicle for driving four wheels is disclosed, which substantially comprises a driving power input shaft on which driving power input gears and at least one of slidable engaging members are mounted, two differential mechanisms, two core shafts, a slidable engaging member for coaxially connecting two core shafts, two gears, two gear shafts for driving corresponding wheel decelerators, two connecting members for driving corresponding wheel decelerators. The performance of the automotive vehicle equipped with the transmission mechanism of the invention can be improved.

20 Claims, 3 Drawing Sheets

TRANSMISSION MECHANISM FOR DRIVING FOUR WHEELS

BACKGROUND OF THE INVENTION

1. Field of the Invention

The present invention relates to a transmission mechanism of an automotive vehicle, and more particularly to an improved transmission mechanism that can drive different wheels of the automotive vehicle.

2. Description of the Related Art

Conventionally, two differential mechanisms are used in an automotive vehicle, which are disposed on the front axle and rear axle, respectively. When the automotive vehicle encounters weaker roads, such as loose soil, foothill and the like, wheels of the automotive vehicle may lose adhesions to the ground to cause skidding. As a result, many transmission mechanisms with a differential gear lock limiting mechanism have been used in some automotive vehicles to overcome the problems. However, the differential gear lock limiting mechanism can limit the steering ability of the automotive vehicle.

Hence, an improved transmission mechanism that overcomes the above-mentioned problems is desired.

SUMMARY OF THE INVENTION

Accordingly, an object of the present invention is to provide an improved transmission mechanism for driving four wheels of an automotive vehicle that overcomes the shortcomings in the prior art.

In order to achieve the above-mentioned object, a transmission mechanism of an automotive vehicle for driving four wheels in accordance with the present invention comprises a driving power input shaft connected with a motor of the automotive vehicle; a first driving power input gear rotably mounted on the driving power input shaft; a first slidable engaging member slidably mounted on the driving power input shaft; a second driving power input gear mounted on the driving power input shaft; a first differential mechanism including a first half shaft sleeve, a second half shaft sleeve, and a first ring gear engaged to the first driving power input gear; a second differential mechanism including a third half shaft sleeve, a fourth half shaft sleeve, and a second ring gear engaged to the second driving power input gear; a first core shaft passing through the first differential mechanism; a second core shaft passing through the second differential mechanism; a second slidable engaging member for coaxially connecting the first core shaft with the second core shaft; a first gear rotably mounted on the second half shaft sleeve; a second gear rotably mounted the fourth half shaft sleeve; a first gear shaft engaged to the first gear for driving a wheel decelerator of the automotive vehicle; a second gear shaft engaged to and the second gear for driving a wheel decelerator of the automotive vehicle; a first connecting member connected with the first core shaft for driving a wheel decelerator of the automotive vehicle; and a second connecting member connected with the second core shaft for driving a wheel decelerator of the automotive vehicle. The first slidable engaging member can be regulated to engage the first driving power input gear, so as to drive different wheels of the automotive vehicle.

In one embodiment of the present invention, a transmission mechanism of an automotive vehicle for driving four wheels includes a driving power input shaft connected with a motor of the automotive vehicle; a first driving power input gear rotably mounted on the driving power input shaft; a first slidable engaging member slidably mounted on the driving power input shaft; a second driving power input gear ratably mounted on the driving power input shaft; a third slidable engaging member slidably mounted on the driving power input shaft; a first differential mechanism including a first half shaft sleeve, a second half shaft sleeve, and a first ring gear engaged to the first driving power input gear; a second differential mechanism including a third half shaft sleeve, a fourth half shaft sleeve, and a second ring gear engaged to the second driving power input gear; a first core shaft passing through the first differential mechanism; a second core shaft passing through the second differential mechanism; a second slidable engaging member for coaxially connecting the first core shaft with the second core shaft; a first gear rotably mounted on the second half shaft sleeve; a second gear rotably mounted the fourth half shaft sleeve; a first gear shaft engaged to the first gear for driving a wheel decelerator of the automotive vehicle; a second gear shaft engaged to and the second gear for driving a wheel decelerator of the automotive vehicle; a first connecting member connected with the first core shaft for driving a wheel decelerator of the automotive vehicle; and a second connecting member connected with the second core shaft for driving a wheel decelerator of the automotive vehicle. The first slidable engaging member and the third slidable engaging member can be regulated to engage the first driving power input gear and the second driving power input gear respectively, so as to drive different wheels of the automotive vehicle.

In another embodiment of the present invention, the second slidable engaging member can be regulated to separate the connection of the first core shaft and the second core shaft so as to drive different wheels of the automotive vehicle. In another embodiment, the a first driving power input gear has a first larger gear to engage the first ring gear, and a first smaller gear that can engage a first inner gear of the first slidable engaging member. In still another embodiment, the first slidable engaging member and the second slidable engaging member provides a first recess and a second recess at the outer surface thereof, respectively, for connecting a fork of a clutch of the automotive vehicle.

In still another embodiment, both of the first gear and the second gear are arc gears, and both of the first gear shaft and the second gear shaft are arc gear shafts. The first connecting member is an arc gear shaft to engage a third arc gear that is disposed coaxially with the first gear and is engaged thereto, and the second connecting member is an arc gear shaft to engage a fourth arc gear that is disposed coaxially with the second gear and is engaged thereto.

Other objects, features and advantages of the present invention will become apparent from the following detailed description when read in conjunction with the accompanying drawings.

DETAILED DESCRIPTION OF THE PREFERRED EMBODIMENT

Figure 1:
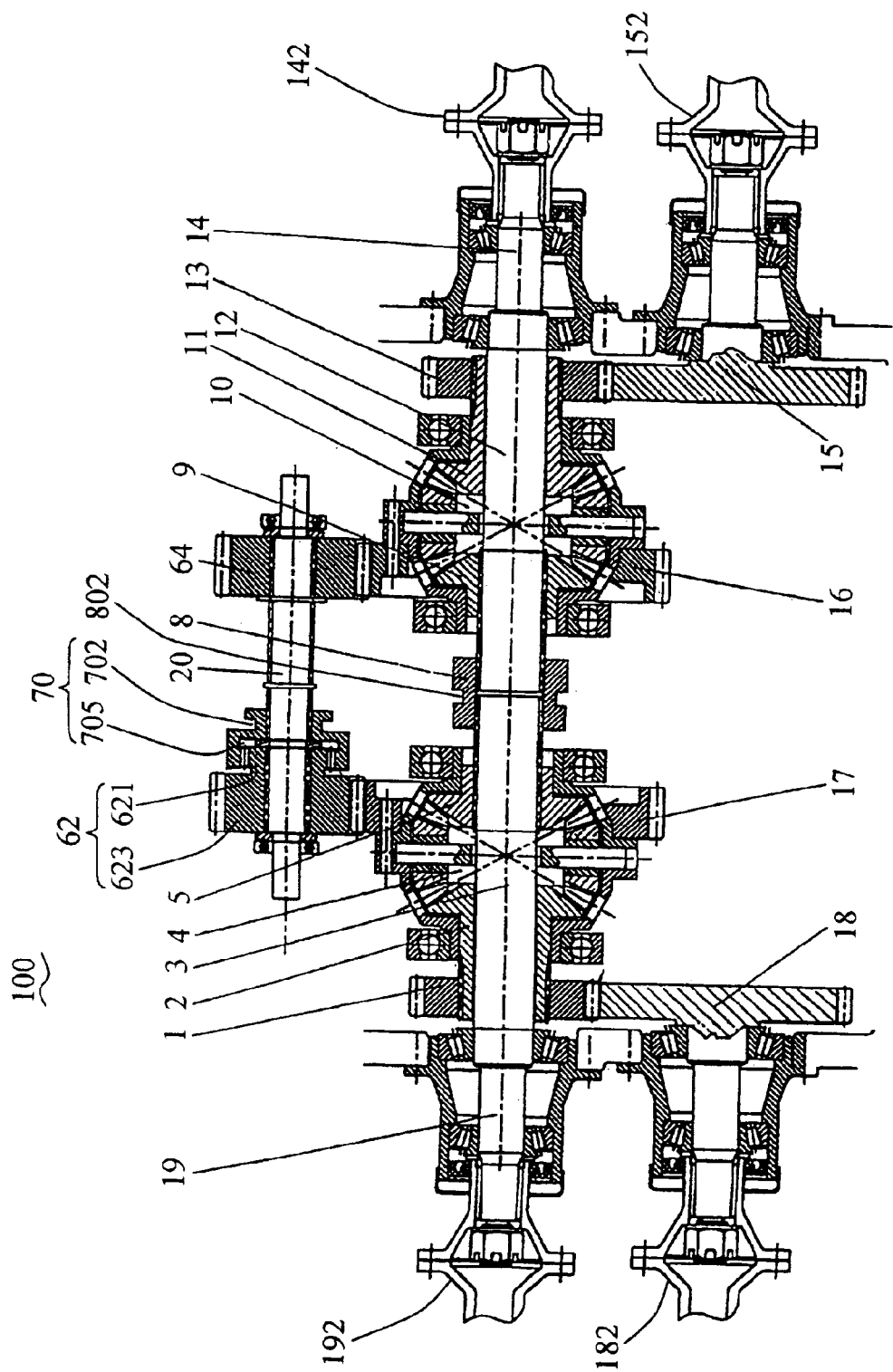
FIG. 1 is a schematic plan view of the embodiment of a transmission mechanism in accordance with the present invention.

The present invention will be further described below with reference to the drawings, in which like reference numerals are used to designate identical or corresponding elements.

Referring to FIG. 1, a transmission mechanism 100 of an automotive vehicle in accordance with the first embodiment of the present invention substantially comprises a driving power input shaft 20, a first differential mechanism 4, a second differential mechanism 10, a first core shaft 3, a second core shaft 12, a first gear shaft 18 and a second gear shaft 15.

The driving power input shaft 20 is connected with an engine (not shown) of the automotive vehicle. A first driving power input gear 62 is a dual tandem gear having a first larger gear 623 and a first smaller gear 621 and is mounted on the input shaft 20 via bearings. A first slidable engaging member 70 is slidably mounted on the input shaft 20 by splines and provides a first inner gear 705 which removably engages the first smaller gear 621 of the dual tandem gear 62. A second driving power input gear 64 is mounted to the input shaft 20 by splines.

Elements of the two differential mechanisms 4, 10 are the same as those in the prior art except those specifically described in this invention. The first differential mechanism 4 includes a first half shaft sleeve 5, a second half shaft sleeve 2, and a first ring gear 17. The second differential mechanism 10 includes a third half shaft sleeve 9, a fourth half shaft sleeve 11, and a second ring gear 16. The first ring gear 17 and the second ring gear 16 mesh with the first larger gear 623 of the first dual tandem gear 62 and the second driving power input gear 64, respectively.

The first core shaft 3 and the second core shaft 12 pass through the first differential mechanism 4 and the second differential mechanism 10, respectively. The first core shaft 3 is disposed coaxially with the second core shaft 12 and is connected with the same by a second through a slidable engaging member 8. The first half shaft sleeve 5 and the third half shaft sleeve 9 both of which are adjacent to the second slidable engaging member 8 are mounted to the first core shaft 3 and the second core shaft 12, respectively. The second half shaft sleeve 2 and the fourth half shaft sleeve 11 both of which are far away from the second engaging member 8 are engaged with the first core shaft 3 and the second core shaft 12, respectively. The first core shaft 3 and is connected to a first wheel decelerator 192 of the vehicle. The second core shaft 12 is connected to a second connecting member 14 which is an output shaft directly extended from the second core shaft 12 and is connected to a second wheel decelerator 142 of the vehicle.

A first gear 1 is provided and mounted on the second half shaft sleeve 2 by splines and engages with a first gear shaft 18 that is directly connected to a third wheel decelerator 182 of the vehicle. A second gear 13 is provided and mounted on the fourth half shaft sleeve 11 by splines and engages with the second gear shaft 15 that is directly connected to a fourth wheel decelerator 152 of the automotive vehicle.

Recesses 702 and 802 are provided at the outer surface of the first slidable engaging member 70 and the second slidable engaging member 8, respectively, to accommodate forks of a clutch of the vehicle(not shown) for controlling the two slidable engaging members 70, 8.

In use, as shown in FIG. 1, the driving power is transmitted to the driving power input shaft 20. When the first inner gear 705 of the first slidable engaging member 70 is regulated to mesh with the first smaller gear 621, the input shaft 20 drives both the first slidable engaging member 70 and the second driving power input gear 64 to rotate around the input shaft 20. Meanwhile, the first slidable engaging member 70 drives the dual tandem gear 62 to rotate round the input shaft 20. Thus, the first ring gear 17 and the second ring gear 16 are driven by the dual tandem gear 62 and the second driving power input gear 64, respectively.

By regulating the second slidable engaging member 8, the first differential mechanism 4 drives the first core shaft 3 to rotate by the first half shaft sleeve 5, then the first core shaft 3 drives the first wheel decelerator 192. Meanwhile, the second half shaft sleeve 2 drives the first gear 1 to rotate, and the first gear 1 drives the first gear shaft 18, thereby to render the third wheel decelerator 182 to rotate. Similarly, the second wheel decelerator 142 and the fourth wheel decelerator 152 can be driven. Thus, the four wheel decelerator 192, 142, 182 and 152 can be driven at the same time.

When the first slidable engaging member 70 is detached from the first smaller gear 621 by controlling the fork, no driving power is transmitted by the first dual tandem gear 62. As described above, the second driving power input gear 64 will drive the second wheel decelerator 142 and the fourth wheel decelerator 152. Meanwhile, the second core shaft 12 can drive the first core shaft 3 to rotate because the first core shaft 3 are connected to the second core shaft by regulating the second slidable engaging member 8. Thus, the first wheel decelerator 192 can be driven. As a result, the three wheel decelerator 192, 142, and 152 can be driven at the same time.

It is to be understood when both of the two slidable engaging members 70, 8 are detached by controlling the corresponding forks, only the two wheel decelerator 142, 152 can be driven.

Figure 2:
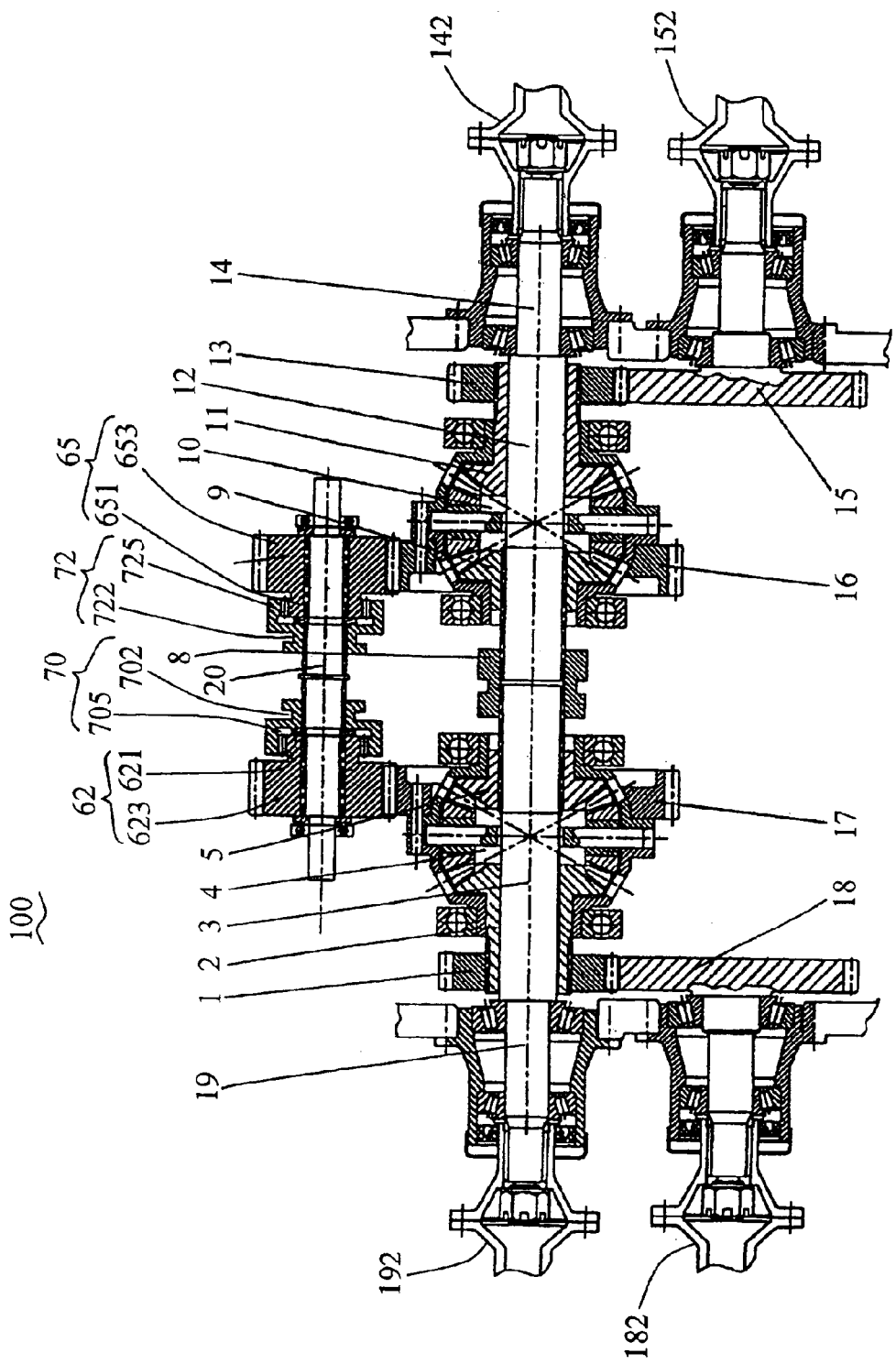
FIG. 2 is a schematic plan view of the second embodiment of a transmission mechanism in accordance with the present invention.

In the second embodiment of the present invention, as shown in FIG. 2, elements of the second embodiment are the same as those of the first embodiment, except that the second driving power input gear 64 is mounted on the input shaft 20 by bearings, a third slidable engaging member 72 is slidably mounted on the input shaft 20 by splines. The second driving power input gear of the second embodiment is a dual tandem gear 65 and includes a second larger gear 653 that engages the second ring gear 16 and a second smaller gear 651. The third slidable engaging member 72 includes a recess 722 and a second inner gear 725 which can engage the second smaller gear 651. When the second slidable engaging member is engaged to the second driving power input gear 65, the power is transmitted to the second differential mechanism 10.

It is understood easily that the two front wheel decelerators, the two rear wheel decelerators, the one front and two rear wheel decelerators, the two front and one rear decelerators, or the four wheel decelerators can be driven at the same time, with the mechanism of the present embodiment.

Figure 3:
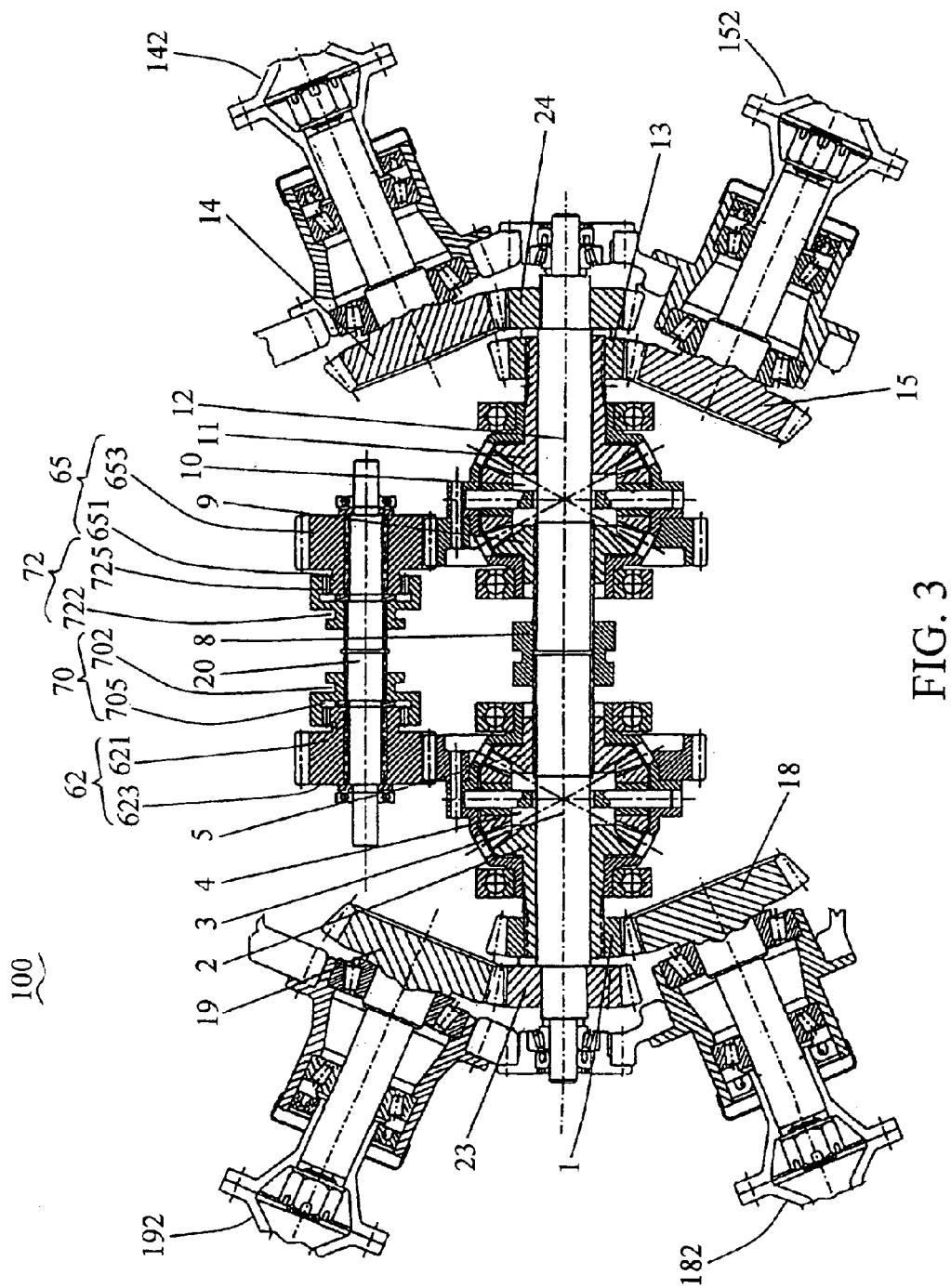
FIG. 3 is a schematic plan view of the third embodiment of a transmission mechanism in accordance with the present invention.

In the third embodiment of the present invention, as shown in FIG. 3, elements of the third embodiment are the same as those of the second embodiment, except those specifically described below. Both the first gear 1 and the second gear 13 are arc gears that are engaged to the first arc gear shaft 18 and the second arc gear shaft 15, respectively. The transmission mechanism 100 of the third embodiment further comprises a third arc gear 23, and a fourth arc gear 24 that are disposed coaxially with the core shafts 3, 12, and are engaged to the arc gear 1 and the arc gear 13. Both the first connecting member 19 and the second connecting member 14 in this embodiment are an arc gear shaft, disposed at the side of the core shafts 3 and 12, and are engaged to the third arc gear 23 and the fourth arc gear 24, respectively. Thus, the power of the motor is transmitted to four wheels in the direction of "X".

As described above, the two front wheel decelerators, the two rear wheel decelerators, the one front and two rear wheel decelerators, the two front and one rear decelerators, or the four wheel decelerators can be driven at the same time.

In contrast to prior art, the transmission mechanism of the present invention can lock the two wheels at the same side by connecting the first core shaft with the second core shaft by the second engaging member. When any of four wheels skids, the vehicle can normally run because the transmission mechanism can limit the speed of the skidding wheel at a certain extent. When two front or two rear wheels skid, the vehicle can also run via another two unskidding rear or front wheels. Thus, the performance of the automotive vehicle is improved.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism for driving four wheels of an automotive vehicle comprising
   a driving power input shaft connected with a motor of the automotive vehicle;
   a first driving power input gear rotably mounted on the driving power input shaft;
   a first slidable engaging member slidably mounted on the driving power input shaft;
   a second driving power input gear mounted on the driving power input shaft;
   a first differential mechanism including a first half shaft sleeve, a second half shaft sleeve, and a first ring gear engaged to the first driving power input gear;
   a second differential mechanism including a third half shaft sleeve, a fourth half shaft sleeve, and a second ring gear engaged to the second driving power input gear;
   a first core shaft passing through the first differential mechanism;
   a second core shaft passing through the second differential mechanism;
   a second slidable engaging member for coaxially connecting the first core shaft with the second core shaft;
   a first gear rotably mounted on the second half shaft sleeve;
   a second gear rotably mounted the fourth half shaft sleeve;
   a first gear shaft engaged to the first gear for driving a wheel decelerator of the automotive vehicle;
   a second gear shaft engaged to the second gear for driving a wheel decelerator of the automotive vehicle;
   a first connecting member connected with the first core shaft for driving a wheel decelerator of the automotive vehicle; and
   a second connecting member connected with the second core shaft for driving a wheel decelerator of the automotive vehicle, wherein the first slidable engaging member can be regulated to engage the first driving power input gear, so as to drive different wheels of the automotive vehicle.

2. The transmission mechanism of claim 1, wherein the second slidable engaging member can be regulated to separate the connection of the first core shaft and the second core shaft so as to drive different wheels of the automotive vehicle.

3. The transmission mechanism of claim 2, wherein the first driving power input gear has a first larger gear to engage the first ring gear, and a first smaller gear that can engage a first inner gear of the first slidable engaging member.

4. The transmission mechanism of claim 2, wherein the first driving power input gear are mounted on the driving power input shaft by a bearing, and the second driving power input gear is mounted on the driving power input shaft by splines.

5. The transmission mechanism of claim 2, wherein the first slidable engaging member and the second slidable engaging member provides a first recess and a second recess at the outer surface thereof, respectively, for connecting a fork of a clutch of the automotive vehicle.

6. The transmission mechanism of claim 3, wherein the first connecting member and the second connecting member are disposed coaxially with the first core shaft and the second core shaft.

7. A transmission mechanism for driving four wheels of an automotive vehicle comprising
   a driving power input shaft connected with a motor of the automotive vehicle;
   a first driving power input gear rotably mounted on the driving power input shaft;
   a first slidable engaging member slidably mounted on the driving power input shaft;
   a second driving power input gear rotably mounted on the driving power input shaft;
   a third slidable engaging member slidably mounted on the driving power input shaft;
   a first differential mechanism including a first half shaft sleeve, a second half shaft sleeve, and a first ring gear engaged to the first driving power input gear;
   a second differential mechanism including a third half shaft sleeve, a fourth half shaft sleeve, and a second ring gear engaged to the second driving power input gear;
   a first core shaft passing through the first differential mechanism;
   a second core shaft passing through the second differential mechanism;
   a second slidable engaging member for coaxially connecting the first core shaft with the second core shaft;
   a first gear rotably mounted on the second half shaft sleeve;
   a second gear rotably mounted the fourth half shaft sleeve;
   a first gear shaft engaged to the first gear for driving a wheel decelerator of the automotive vehicle;
   a second gear shaft engaged to the second gear for driving a wheel decelerator of the automotive vehicle;
   a first connecting member connected with the first core shaft for driving a wheel decelerator of the automotive vehicle; and
   a second connecting member connected with the second core shaft for driving a wheel decelerator of the automotive vehicle, wherein the first slidable engaging member and the third slidable engaging member can be regulated to engage the first driving power input gear and the second driving power input gear respectively, so as to drive different wheels of the automotive vehicle.

8. The transmission mechanism of claim 7, wherein the second slidable engaging member can be regulated to separate the connection of the first core shaft and the second core shaft so as to drive different wheels of the automotive vehicle.

9. The transmission mechanism of claim 8, wherein the first driving power input gear has a first large gear to engage the first ring gear and a first small gear that can engage a first inner gear of the first slidable engaging member, and the second driving power input gear has a second larger gear to engage the second ring gear and a second smaller gear that can engage a second inner gear.

10. The transmission mechanism of claim 8, wherein the first driving power input gear is mounted on the driving power input shaft by a bearing, and the second driving power input gear is mounted on the driving power input shaft by a bearing.

11. The transmission mechanism of claim 8, wherein the first slidable engaging member, the second slidable engaging member and the third slidable engaging member provide a first recess, a second recess and a third recess at the outer surface thereof, respectively, for connecting a fork of a clutch of the automotive vehicle.

12. The transmission mechanism of claim 9, wherein the first connecting member and the second connecting member are disposed coaxially with the first core shaft and second core shaft.

13. The transmission mechanism of claim 8, wherein both of the first gear and the second gear are arc gears, and both of the first gear shaft and the second gear shaft are arc gear shafts.

14. The transmission mechanism of claim 9, wherein both of the first gear and the second gear are arc gears, and both of the first gear shaft and the second gear shaft are arc gear shafts.

15. The transmission mechanism of claim 10, wherein both of the first gear and the second gear are arc gears, and both of the first gear shaft and the second gear shaft are arc gear shafts.

16. The transmission mechanism of claim 11, wherein both of the first gear and the second gear are arc gears, and both of the first gear shaft and the second gear shaft are arc gear shafts.

17. The transmission mechanism of claim 12, wherein both of the first gear and the second gear are arc gears, and both of the first gear shaft and the second gear shaft are arc gear shafts.

18. The transmission mechanism of claim 13, wherein the first connecting member is an arc gear shaft to engage a third arc gear that is disposed coaxially with the first gear and is engaged thereto, and the second connecting member is an arc gear shaft to engage a fourth arc gear that is disposed coaxially with the second gear and is engaged thereto.

19. The transmission mechanism of claim 14, wherein the first connecting member is an arc gear shift to engage a third arc gear that is disposed coaxially with the first gear and is engaged thereto, and the second connecting member is an arc gear shaft to engage a fourth arc gear that is disposed coaxially with the second gear and is engaged thereto.

20. The transmission mechanism of claim 15, wherein the first connecting member is an arc gear shift to engage a third arc gear that is disposed coaxially with the first gear and is engaged thereto, and the second connecting member is an arc gear shaft to engage a fourth arc gear that is disposed coaxially with the second gear and is engaged thereto.

\* \* \* \* \*

UNITED STATES PATENT AND TRADEMARK OFFICE
CERTIFICATE OF CORRECTION

PATENT NO. : 6,854,359 B1
DATED : February 15, 2005
INVENTOR(S) : Weijin Ma and Mingxue Yang It is certified that error appears in the above-identified patent and that said Letters Patent is hereby corrected as shown below:

<u>Column 8,</u>
Lines 21 and 27, please delete "shift" and insert -- shaft -- therefor.

Signed and Sealed this

Fourth Day of October, 2005

JON W. DUDAS
*Director of the United States Patent and Trademark Office*